United States Patent [19]

Thornton

[11] 4,247,610
[45] Jan. 27, 1981

[54] AQUEOUS ELECTROLYTE FOR SECONDARY ELECTROCHEMICAL CELLS

[75] Inventor: Roy F. Thornton, Schenectady, N.Y.

[73] Assignee: General Electric Company, Schenectady, N.Y.

[21] Appl. No.: 67,695

[22] Filed: Aug. 20, 1979

[51] Int. Cl.³ .......................................... H01M 10/26
[52] U.S. Cl. ................... 429/199; 429/203; 429/207
[58] Field of Search ............... 429/199, 203, 206, 207, 429/188

[56] References Cited

U.S. PATENT DOCUMENTS

| | | | |
|---|---|---|---|
| 2,992,143 | 7/1961 | Clifford et al. | 429/203 X |
| 3,051,768 | 8/1962 | Kujas | 429/199 |
| 3,849,199 | 11/1974 | Feuillade et al. | 429/199 |

OTHER PUBLICATIONS

N. Cenek et al., "New Possibilities in the Technology of Electrodes for Alkaline Accumulators", Paper No. 15, pp. 1-6 and figures 1-15, the 10th International Power Sources Symposium, Brighton, England, 1976.

Schneider et al., "Bipolar NiO(OH)—$K_3BO_3$—Zn Accumulator", Paper No. 9, pp. 103-128, in Power Sources 4 by D. H. Collins, Editor, 1973.

*Primary Examiner*—Anthony Skapars
*Attorney, Agent, or Firm*—Paul R. Webb, II; James C. Davis, Jr.

[57] ABSTRACT

An aqueous electrolyte, which is particularly suitable for secondary electrochemical cells with zinc electrodes, is disclosed which comprises an aqueous solution of from 18 to 30 percent potassium fluoride (KF) and from 15 to 2 percent potassium hydroxide (KOH) wherein the total dissolved content is within a range from 20 to 45 percent.

4 Claims, No Drawings

AQUEOUS ELECTROLYTE FOR SECONDARY ELECTROCHEMICAL CELLS

Reference is made to copending patent application Ser. No. 067,696 filed Aug. 20, 1979, and entitled "Aqueous Electrolyte for Secondary Electrochemical Cells" by the same inventor. This copending application describes and claims an aqueous electrolyte containing phosphoric acid and potassium hydroxide. The copending application is assigned to the same assignee as the present application.

This invention relates to an aqueous electrolyte, which is particularly suitable for secondary electrochemical cells with zinc electrodes and more particularly, to such aqueous electrolytes which contain from 18 to 30 percent of potassium fluoride and from 15 to 2 percent potassium hydroxide wherein the total dissolved content is within a range from 20 to 45 percent.

An article entitled, "New Possibilities in the Technology of Electrodes for Alkaline Accumulators", by N. Cenek et al., was published as paper No. 15, pages 1-6 and FIGS. 1-15 in the 10th International Power Sources Symposium, Brighton, England, 1976. This paper describes electrochemical cells with zinc electrodes in which the electrolytes used were 21 percent, 30 percent, and 30.5 percent potassium hydroxide solution. Further, this paper points out on page 3 that an electrolyte was used containing 20 percent potassium hydroxide and 10 percent potassium fluoride. On page 6 of this paper, it points out that the increase in capacity during cycling while employing the 20 percent potassium hydroxide and 10 percent potassium fluoride may cause a gradual transition of the active mass in the discharge state to zinc fluoride.

U.S. Pat. No. 3,849,199—Feuillade et al., entitled "Electrochemical Generator with a Zinc Electrode", describes the use of an aqueous basic solution of an alkaline polyacid phosphate salt in a concentration such that the pH is maintained substantially constant and contains an alkaline halide, which electrolyte is used with a non-conventional zinc electrode.

An article entitled, "Bipolar $NiO(OH)$—$K_3BO_3$—$Zn$ Accumulator" by Schneider et al., which was published as paper No. 9, on pages 103 through 128, in "Power Sources 4" by D. H. Collins, Editor, 1973, reports on the operation of a $NiO(OH)$—$K_3BO_3$—$Zn$ bipolar battery. A range of electrolyte compositions from KOH to $KH_2BO_3$ was tested and $K_3BO_3$ was chosen as best.

A secondary electrochemical cell with an alkaline electrolyte of potassium hydroxide and zinc negative electrodes is subject to life limiting problems with the zinc electrode. Because the zinc discharge products are highly soluble in the electrolyte, secondary zinc electrodes suffer from slumping, shape change, densification, and dendrite growth. On recharge, the zinc active material does not replate in its original form and location, and under some charging conditions plates in the form of dendrites which can short to the positive plate.

I found an unique electrolyte to reduce the solubility of the zinc discharge products. Such an electrolyte allows reasonable rates of charge and discharge of the zinc and the positive electrodes over a useful temperature range and possesses sufficient ionic conductivity to allow a finished cell to have a low internal resistance. As opposed to the above Cenek et al. article, I did not find that an insoluble zinc compound, such as zinc fluoride, was formed. However, I found that zinc solubility was related to the potassium hydroxide concentration or hydroxyl ion concentration. I found further that with increasing potassium fluoride concentration and decreasing potassium hydroxide concentration in the electrolyte solution, zinc solubility, dendrite formation and electrode shape change all decrease. However, rate capability and cell discharge capacity decrease. Thus, the choice of a preferred electrolyte depends on the specific battery application. Rate capability is traded off against cycle life and tendency to short internally.

I found that the aqueous electrolyte of my invention should comprise an aqueous solution of from 18 to 30 percent potassium fluoride and from 15 to 2 percent potassium hydroxide wherein the total dissolved content is within a range from 20 to 45 percent. A preferred aqueous electrolyte comprised an aqueous solution of 26.8 percent potassium fluoride and 4.8 percent potassium hydroxide.

Six electrolytes were tested to measure the solubility of ZnO, conductivity and utilization of $NiOOH$/$Ni(OH)_2$ electrode in each electrolyte. The results of these tests are shown below in Table I wherein the six electrolytes are designated 1-6, the compositions are set forth in weight percent, the ZnO solubility is listed in milligrams of zinc per milliliter, the conductivity is described in $(\text{ohm centimeter})^{-1}$, and the nickel hydroxide electrode utilization is set forth as a percentage of the utilization in 31% KOH.

TABLE I

| Electrolyte No. | Composition Wt. % | ZnO Solubility Mg Zn/ml | Conductivity $(\text{ohm cm})^{-1}$ | Nickel Hydroxide Electrode Utilization |
|---|---|---|---|---|
| 1 | 31% KOH | 46.0 | 0.64 | 100% |
| 2 | 5% KOH | 1.2 | 0.18 | 100% |
| 3 | 20.1% KOH + 10% KF | 21.0 | 0.53 | 110% |
| 4 | 22% KF + 10% KOH | 5.6 | 0.46 | 99% |
| 5 | 26.8% KF + 4.8% KOH | 1.4 | 0.35 | 95% |
| 6 | 30% KF + 2% KOH | 0.3 | 0.37 | 75% |

As it is shown in above Table I, electrolytes 1 and 2 are control electrolytes. Electrolyte 1 exhibits high ZnO solubility and high conductivity. Electrolyte 2 exhibits low solubility, but also low conductivity. Electrolyte 3 is quite similar to the electrolyte described on page 3 of the above Cenek et al. paper wherein the composition is 20 percent potassium hydroxide and 10 percent potassium fluoride. Electrolyte 3 has a high ZnO solubility. Electrolytes 4-6 are electrolytes made in accordance with my invention.

The effects of the electrolytes on the capacities of nickel hydroxide electrodes was measured in small flooded cells. A test electrode 15 cm² in area was placed in a 30 ml cell with a counter electrode on each side. Test electrodes were cut from commercial sintered type battery plates. The electrodes were cycled using a 150 milliamp charge for 4.2 hours followed by a discharge at 600 milliamp to a cut-off of 0.22 volt versus a Hg/HgO reference. After a test electrode had been cycled several times in 31% KOH, the cell was cleaned and filled with an experimental electrolyte and the cycling was continued.

Zinc electrodes of about 1.3 amp-hr theoretical capacity were prepared by pasting on 18 cm² silver mesh grids. These were assembled into sealed test cells. Each test cell contained one zinc electrode flanked between two nickel hydroxide electrodes. Appropriate separators were used between the electrodes. The cells were filled with the test electrolyte.

The cells were tested by charge-discharge cycling at two cycles per day. Charging was done at 57 milliamperes until the cell voltage increased to 1.9 to 2.1 volts. Discharge was done at 100 milliamperes until the cell voltage declined to 1.0 volt. Results of the tests are shown in Table II. The electrolytes of this invention gave substantially improved performance. The zinc electrodes from the cells containing the electrolytes of this invention showed greatly reduced shape change and slumping.

TABLE II

| Cell/Electrolyte No. | Cycles on Test | Final Discharge Cap. amp-hr | Cause of Failure |
| --- | --- | --- | --- |
| 1 | 4 | .27 | Shorting |
| 3 | 6 | .13 | Shorting |
| 4 | 85 | .34 | None |
| 5 | 85 | .24 | None |
| 6 | 85 | .24 | None |

While other modifications of the invention and variations thereof which may be employed within the scope of this invention have not been described, the invention is intended to include such as may be embraced within the following claims:

What I claim as new and desire to secure by Letters Patent of the United States is:

1. In a secondary electrochemical cell with a zinc electrode, an aqueous electrolyte comprising an aqueous solution of from 18 to 30 percent potassium fluoride and from 15 to 2 percent potassium hydroxide wherein the total dissolved content is within a range from 20 to 45 percent.

2. In a secondary electrochemical cell with a zinc electrode, an aqueous electrolyte as in claim 1, in which there is 26.8 percent potassium fluoride and 4.8 percent potassium hydroxide.

3. In a secondary electrochemical cell with a zinc electrode, an aqueous electrolyte as in claim 1, in which there is 30 percent potassium fluoride and 2 percent potassium hydroxide.

4. In a secondary electrochemical cell with a zinc electrode, an aqueous electrolyte as in claim 1, in which there is 22 percent potassium fluoride and 10 percent potassium hydroxide.

* * * * *